(12) United States Patent
Greiner

(10) Patent No.: US 6,904,679 B2
(45) Date of Patent: Jun. 14, 2005

(54) LINEAR ROLLING BEARING

(75) Inventor: Heinz Greiner, Ebersbach (DE)

(73) Assignee: Ina Walzlager Schaeffler oHG (DE)

(*) Notice: Subject to any disclaimer, the term of this patent is extended or adjusted under 35 U.S.C. 154(b) by 0 days.

(21) Appl. No.: 10/848,462

(22) Filed: May 18, 2004

(65) Prior Publication Data

US 2004/0213486 A1 Oct. 28, 2004

Related U.S. Application Data

(62) Division of application No. 09/777,122, filed on Feb. 5, 2001, now Pat. No. 6,808,309.

(30) Foreign Application Priority Data

Feb. 9, 2000 (DE) .......................... 100 05 719

(51) Int. Cl.[7] ............................ B21D 53/10; B24B 7/30
(52) U.S. Cl. ........................ 29/898.03; 451/52; 384/45
(58) Field of Search ...................... 29/898.03; 451/52; 384/45, 43, 49

(56) References Cited

U.S. PATENT DOCUMENTS 2,807,916 A * 10/1957 Squire et al. ................. 451/52
4,693,040 A * 9/1987 Teramachi ................... 451/52
5,086,592 A * 2/1992 Schreiber ..................... 451/52

* cited by examiner

*Primary Examiner*—Xuan Lan Nguyen
(74) *Attorney, Agent, or Firm*—Muserlian, Lucas and Mercanti

(57) ABSTRACT

A linear rolling bearing has a guide carriage (1) that is U-shaped in cross-section and has two U-legs (6). The guide carriage (1) is slidably supported through balls (3) on two longitudinal sides of a guide rail (2). Each U-leg (6) comprises on an inner surface opposing the guide rail (2) a ground raceway (10) for the balls (3). The raceway (10) is made by a grinding wheel whose diameter is larger than the diagonal dimension of the carriage cavity (7). According to the invention, a stop surface (12) having a retaining contour for a guide member (4) containing the balls (3) is configured on a guide rail-distal outer surface of each U-leg (6) of the guide carriage (1), and the raceway (10) on one of the two U-legs (6) and the stop surface (12) having the retaining contour on the other of the two U-legs (6) are made in common in one work step by the grinding wheel.

5 Claims, 2 Drawing Sheets

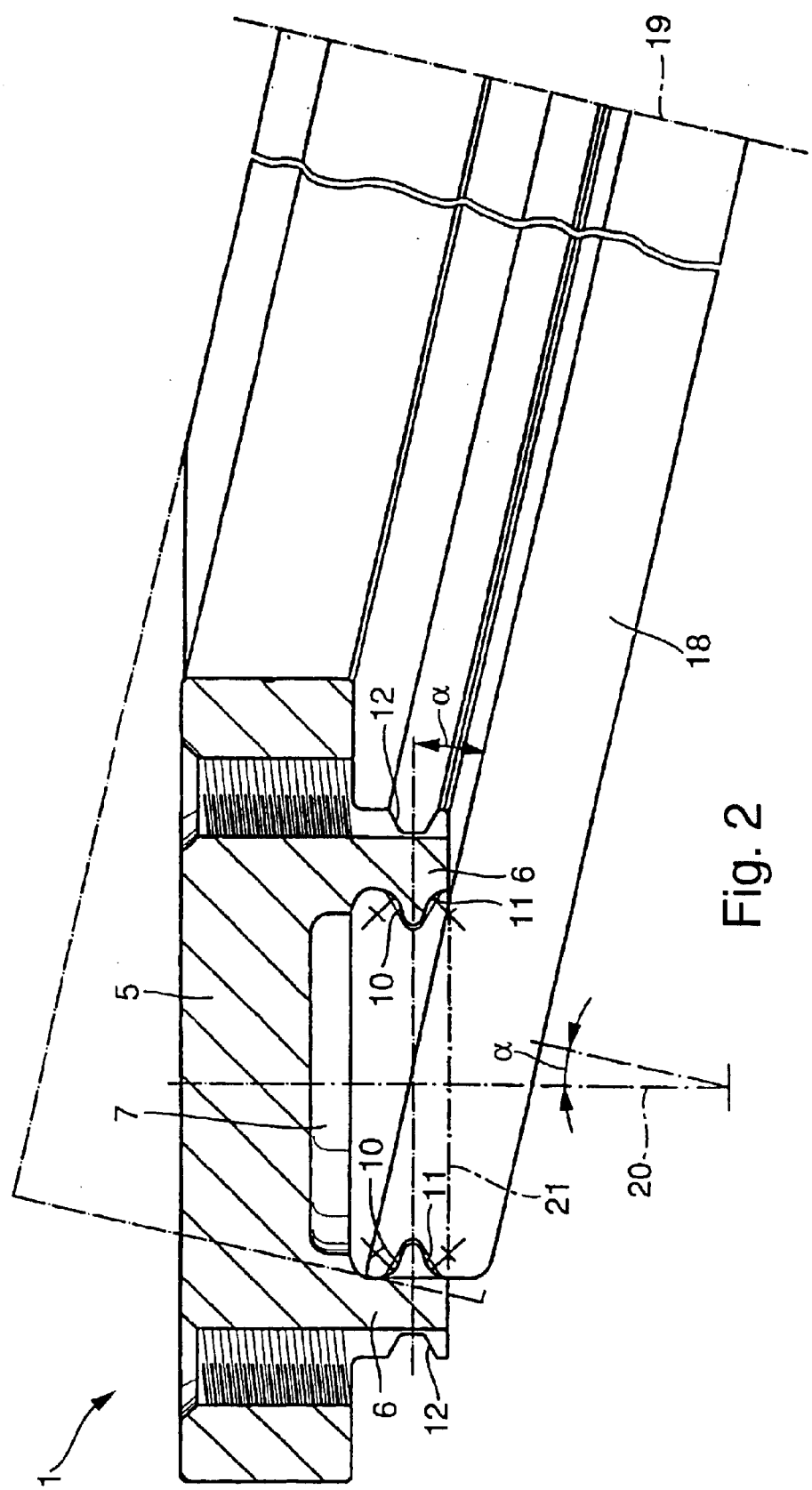

LINEAR ROLLING BEARING

This application is a division of U.S. patent application Ser. No. 09/777,122 filed Feb. 5, 2001, now U.S. Pat. No. 6,808,309.

FIELD OF THE INVENTION

The invention concerns a linear rolling bearing comprising a guide carriage with a U-shaped cross-section having a U-crossbar and two U-legs so that the guide carriage forms a carriage cavity and partially surrounds a guide rail while being slidably supported through balls on two longitudinal sides of the guide rail, each U-leg of the guide carriage having on an inner surface opposing the guide rail a ground raceway with an approximately quarter circle cross-section for the balls, the raceway being made by a grinding wheel whose diameter is larger than a diagonal dimension of the carriage cavity and whose axis of rotation is situated outside of the guide carriage and forms an acute angle with an axis of symmetry of the guide carriage.

BACKGROUND OF THE INVENTION

Raceways of carriages for profiled rail guides are made either using small vertical grinding wheels or several inclined grinding wheels arranged behind one another. Small grinding wheels result in unfavorable grinding values, short tool lives and poor surface quality. If several inclined wheels are used, the inner space of the guide carriage i.e., the carriage cavity likewise limits the size of the wheels. The advantage, however, is the inclined position of the grinding wheel. Therefore a limited but somewhat larger wheel is used.

At the same speed of rotation, a higher peripheral speed is obtained with a grinding wheel having a large diameter than with a wheel having a small diameter. With a large diameter, a higher grinding performance and a prolongation of the service life of the wheel are obtained. The rotational speed of the grinding spindle cannot be infinitely increased because this would lead to a destruction of its bearings.

The publication EP 0 318 980 B1 discloses a linear ball bearing having a guide carriage, designated as a bearing body, that has a leg section with an upper groove with an approximately semi-circular cross-section for load-bearing balls and a lower groove with an approximately quarter circle cross-section for load-bearing balls. A drawback of this lies in the continuation of the radius of the upper groove up to the vertical inner wall of the leg section. This necessarily means that for making the upper groove by grinding, a small grinding wheel must be used.

The publication DE 33 31 287 C2 discloses a method of grinding the bearing body of a linear ball bearing. In this method, two raceways for load-bearing balls are ground on the inner surface of a U-crossbar of a guide carriage using a grinding wheel with a large diameter which is placed inclined to the guide carriage. The return canals for the balls that are arranged in circuits are configured as bores in the guide carriage and have to be made in special work steps in addition to the raceways for the load-bearing balls.

The publication DE 33 04 895 C2 shows a linear ball bearing with bearing bodies in which each ball recirculating shoe or bearing body comprises attached sheet metal parts viz., a W-shaped ball retainer for the load-bearing balls and a cover with a U-shaped cross-section which outwardly closes ball-guiding grooves for the non-loaded returning balls. Due to these additional sheet metal parts, the structure and assembly of the ball recirculating shoe is complicated and expensive.

The publication DE 30 19 131 A1 discloses a linear ball bearing in which continuous longitudinal openings are provided in the load-bearing regions and the return regions for the balls in the guide elements that are made as retaining plates. Therefore each guide element not only has in its ball region a narrow outwardly oriented opening but is also open towards the machine element that acts as a guide carriage. The balls extend through these openings and are guided on longitudinal raceways that have to be made as grooves in the machine element so that additional machining and tool costs are incurred.

OBJECTS OF THE INVENTION

It is an object of the invention to provide a linear rolling bearing which can be made with low machining costs and a short machining time under good grinding conditions so that raceways with a very high surface quality can be realized.

This and other objects and advantages of the invention will become obvious from the following detailed description.

SUMMARY OF THE INVENTION

The invention achieves the above objects by the fact that a stop surface having a retaining contour for a guide member containing the balls is configured on a guide rail-distal outer surface of each U-leg of the guide carriage, and the raceway on one of the two U-legs and the stop surface having the retaining contour on the other of the two U-legs are made in common in one work step by the grinding wheel. Due to the simultaneous grinding of a raceway and a stop surface, the machining time of the guide carriage of the linear bearing is considerably shortened.

Further advantageous features of the invention and a detailed description of one example of embodiment of the invention shown in the drawings will be given hereinafter.

BRIEF DESCRIPTION OF THE DRAWINGS

FIG. 2 shows a guide carriage of the linear bearing in cross-section, with a grinding wheel in contact with the surfaces to be ground.

DETAILED DESCRIPTION OF THE DRAWINGS

Figure 1:
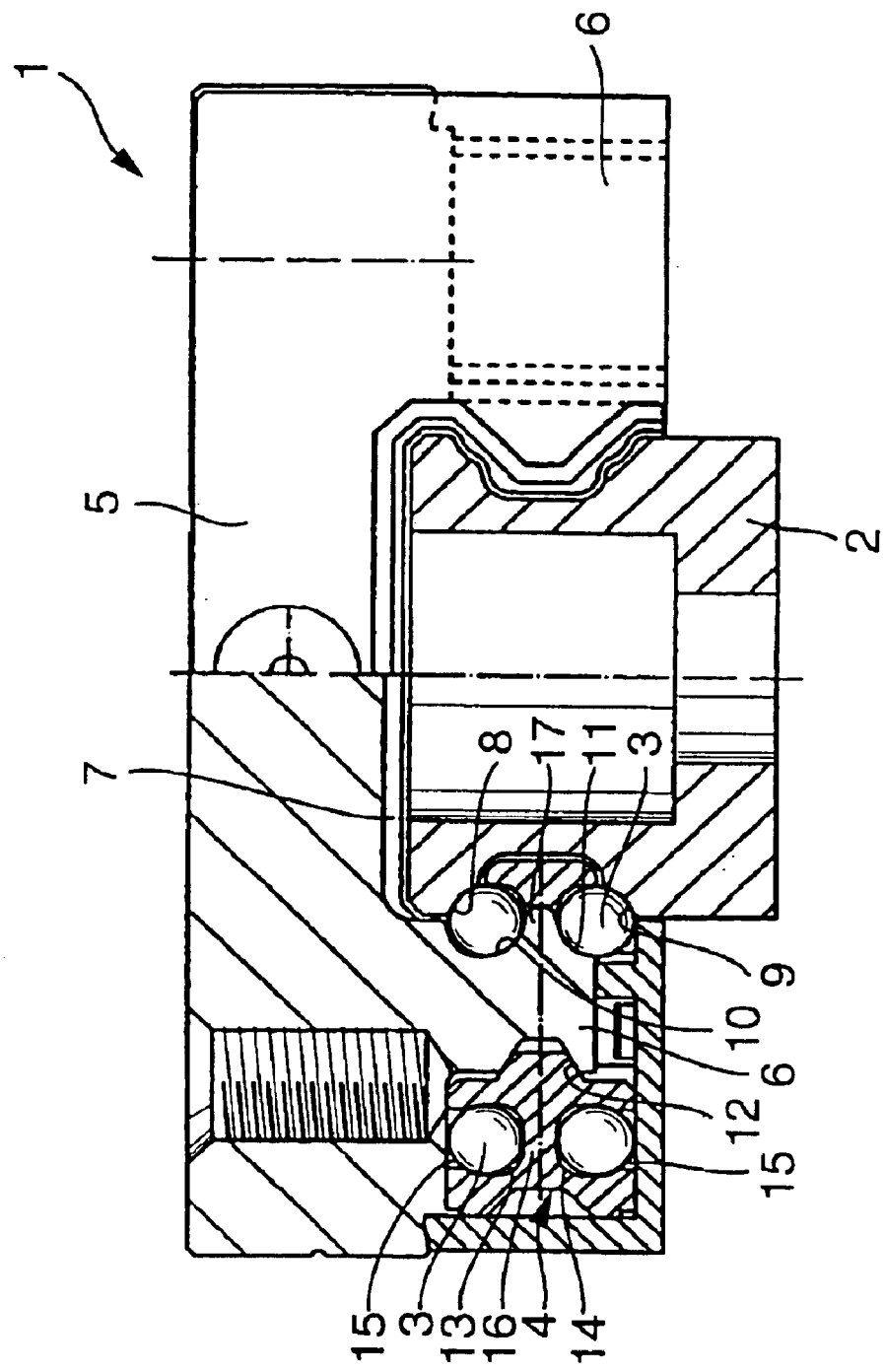
FIG. 1 shows a linear bearing of the invention, partly in cross-section and partly in a front view.

The linear rolling bearing illustrated in FIG. 1 comprises a guide carriage 1 that is supported through balls 3 on a guide rail 2 and is displaceable in the longitudinal direction of the rail. The linear rolling bearing is configured with two guide members 4 as a four-row bearing. Each guide member 4 contains two canals that effect the deflection and return of the balls 3 that are arranged in endless circuits. The guide carriage 1 has a U-shaped configuration and comprises a U-crossbar 5 and two U-legs 6 continuing therefrom. In this way, the guide carriage 1 forms a carriage cavity 7 and partially surrounds the guide rail 2 so that this projects into the carriage cavity 7.

The ground raceway 10 made by grinding has an approximately quarter circle cross section for the balls 3. The ground raceway 10 of each U-leg 6 of the guide carriage us situated nearer the U-crossbar 5, and each U-leg 6 comprises on the inner surface another raceway 11 that is situated further away from the U-crossbar 5 and has an approximately quarter circle cross-section for the balls 3.

Two raceways for balls 3 are configured on each longitudinal side of the guide rail 2 i.e., on each side of the guide rail 2 there is configured an upper raceway 8 and a lower raceway 9. These raceways 8 and 9 are parallel to each other in the longitudinal direction of the guide rail 2. The guide carriage 1 is supported on these raceways through the balls 3. For this purpose, the guide carriage 1 has on the inner surface of each U-leg 6 adjacent the guide rail 2, an upper raceway 10 that is situated nearer the U-crossbar 5 and a lower raceway 11 that is situated further away from the U-crossbar 5.

The load-bearing balls 3 are arranged on each longitudinal side of the guide rail 2 between each of the raceways 8 and 9 of the guide rail 2 and corresponding raceways 10 and 11 of the guide carriage 1. Two of the four endless circuits of balls 3 are arranged on each longitudinal side of the guide rail 2. Each guide member 4 surrounds one of the U-legs 6 and is retained on a stop surface 12 of this U-leg 6. The stop surface 12 has a retaining contour and is situated on the guide rail-distal outer side of each U-leg 6. Two return canals for the balls i.e., an upper return canal 13 and a lower return canal 14, extending parallel to the raceways 10 and 11 of the U-leg 6 are formed in the guide member 4. At their ends, these canals merge into deflector canals that connect the return canals 13 and 14 to the associated regions of load-bearing balls 3 between the raceways 8 and 10, and between the raceways 9 and 11 respectively. Thus, the upper return canal 13 is connected to the raceway 10, and the lower return canal 14 is connected to the raceway 11.

The return canals 13 and 14 have an inner diameter corresponding to the diameter of the balls 3 and a radial opening 15 that extends in the longitudinal direction of the guide rail 2 and whose width is smaller than the ball diameter. On their longitudinal sides opposite the opening 15, the return canals 13 and 14 comprise a common bottom wall 16 so that the balls 3 are retained in their respective return canals 13 and 14 in the guide member 4 even when the guide member 4 is separated from the guide carriage 1. The guide member 4 can be made as an elastic component out of a plastic or a metal. Between its two raceways 10 and 11 for the load-bearing balls 3, the U-leg 6 comprises a projecting lug 17 that helps in unmistakably fixing and retaining the guide member 4 in the bearing.

FIG. 2 shows the manner in which the guide carriage 1 is machined with a grinding wheel 18. The axis of rotation 19 of the grinding wheel 18 is situated outside of the guide carriage 1 and is disposed at an acute angle α to the axis of symmetry 20 of the guide carriage 1. This permits a simultaneous grinding both of the raceway 10 situated nearer the U-crossbar 5 and the raceway 11 situated further away from the U-crossbar 5 of the inner surface of one of the U-legs 6 using one part of the grinding wheel 18 and, at the same time, a grinding of the stop surface 12 on the outer surface of the other U-leg 6 using another part of the grinding wheel 18. The acute angle α that the axis of rotation 19 of the grinding wheel 18 forms with the axis 20 of symmetry of the guide carriage 1 is about 15°. To enable a part of the grinding wheel to be inserted into the carriage cavity and grind the raceways 10 and 11, both the raceways 11 of the guide carriage 1 situated further away from the U-crossbar 5 end at an imaginary connecting plane 21 that extends through the centers of the load-bearing balls 3 circulating on the raceways 11 and limits the two U-legs 6 on their undersides.

What is claimed is:

1. A method of producing a linear rolling bearing comprising a guide carriage with a U-shaped cross-section having a U-crossbar and two U-legs so that the guide carriage forms a carriage cavity and partially surrounds a guide rail while being slidably supported through balls on two longitudinal sides of the guide rail, each U-leg of the guide carriage having on an inner surface opposing the guide rail a ground raceway with an approximately quarter circle cross-section for the balls, comprising forming the raceway with a grinding wheel whose diameter is larger than a diagonal dimension of the carriage cavity and whose axis of rotation is situated outside of the guide carriage and forms an acute angle ($\alpha$) with an axis of symmetry of the guide carriage, wherein a stop surface having a retaining contour for a guide member containing the balls is configured on a guide rail-distal outer surface of each U-leg of the guide carriage, and the raceway on one of the two U-legs and the stop surface having the retaining contour on the other of the two U-legs are made in common in a single work step by the grinding wheel.

2. The method of claim 1 wherein the acute angle ($\alpha$) that the axis of rotation of the grinding wheel forms with the axis of symmetry of the guide carriage is about 15°.

3. The method of claim 1 wherein the guide member containing the balls are detachably fixed on the guide carriage and extend in longitudinal direction from raceways of the guide rail, wherein the balls form endless ball circuits and the guide member comprises for each ball circuit, a region for load-bearing balls, a return canal for returning balls and two deflecting canals that connect the region for load-bearing balls and the return canal to each other at ends thereof.

4. The method of claim 3 wherein each return canal made in the guide member comprises an opening extending along an entire length of the return canal, and said opening also extends along each deflecting canal.

5. The method of claim 4 wherein a width of the opening of the return canal is smaller than a diameter of the balls inserted in the return canal.

* * * * *